(12) United States Patent
Lee et al.

(10) Patent No.: US 9,274,939 B2
(45) Date of Patent: Mar. 1, 2016

(54) MEMORY SYSTEM

(71) Applicant: SK hynix Inc., Icheon-si Gyeonggi-do (KR)

(72) Inventors: Yun Kyoung Lee, Seoul (KR); Jung Ryul Ahn, Namyangju-si (KR)

(73) Assignee: SK Hynix Inc., Gyeonggi-do (KR)

( * ) Notice: Subject to any disclaimer, the term of this patent is extended or adjusted under 35 U.S.C. 154(b) by 246 days.

(21) Appl. No.: 14/063,159

(22) Filed: Oct. 25, 2013

(65) Prior Publication Data

US 2015/0046666 A1 Feb. 12, 2015

(30) Foreign Application Priority Data

Aug. 9, 2013 (KR) ........................ 10-2013-0095014

(51) Int. Cl.
*G11C 29/00* (2006.01)
*G06F 12/02* (2006.01)
*G06F 12/08* (2006.01)

(52) U.S. Cl.
CPC ............ *G06F 12/02* (2013.01); *G06F 12/0246* (2013.01); *G06F 12/08* (2013.01); *G06F 2212/7201* (2013.01); *G06F 2212/7211* (2013.01)

(58) Field of Classification Search
CPC ....................................................... G06F 12/08
See application file for complete search history.

(56) References Cited

U.S. PATENT DOCUMENTS

| | | | |
|---|---|---|---|
| 2009/0003055 A1* | 1/2009 | Hwang | 365/185.03 |
| 2012/0144249 A1* | 6/2012 | Franceschini et al. | 714/54 |
| 2013/0058145 A1* | 3/2013 | Yu et al. | 365/49.17 |
| 2013/0132652 A1* | 5/2013 | Wood et al. | 711/103 |
| 2013/0262743 A1* | 10/2013 | Bedeschi | 711/103 |
| 2014/0059286 A1* | 2/2014 | Matsuo et al. | 711/105 |

FOREIGN PATENT DOCUMENTS

| | | |
|---|---|---|
| KR | 1020110041501 A | 4/2011 |
| WO | 2010002942 A1 | 1/2010 |

* cited by examiner

*Primary Examiner* — Adam M Queler
*Assistant Examiner* — Trang Ta
(74) *Attorney, Agent, or Firm* — William Park & Associates Ltd.

(57) ABSTRACT

A memory system includes: a memory controller configured to change data to be stored in memory cells according to an address of a weak cell in order to store changed data having a lower program level than a highest program level among a plurality of program levels in peripheral cells adjacent to the weak cell; and a memory device configured to execute a program loop in order to store the changed data in a selected page.

18 Claims, 7 Drawing Sheets

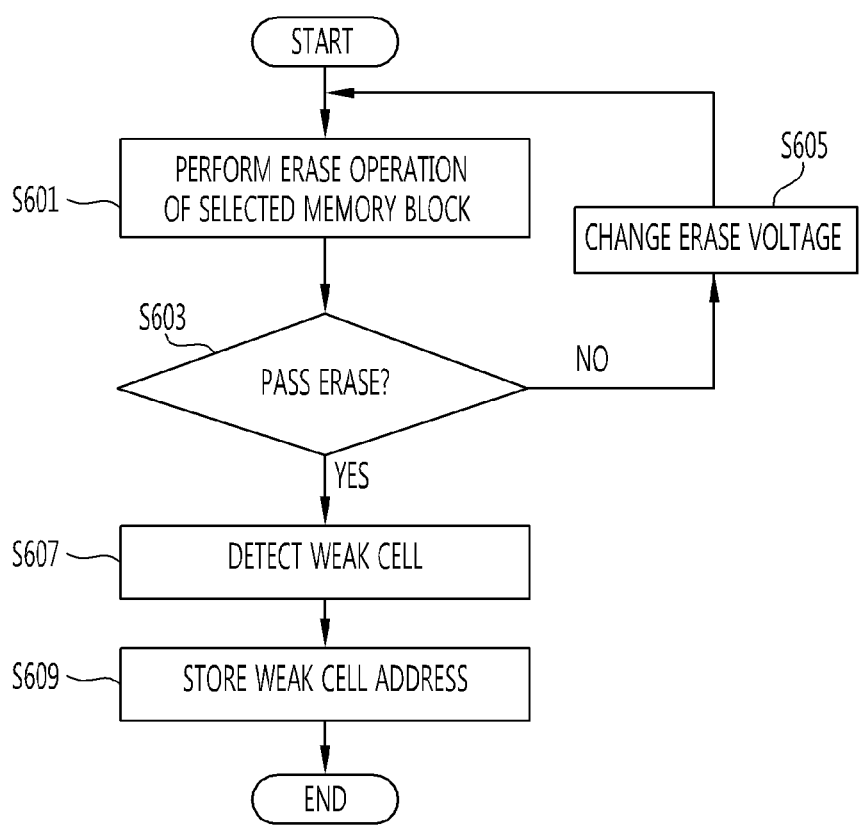

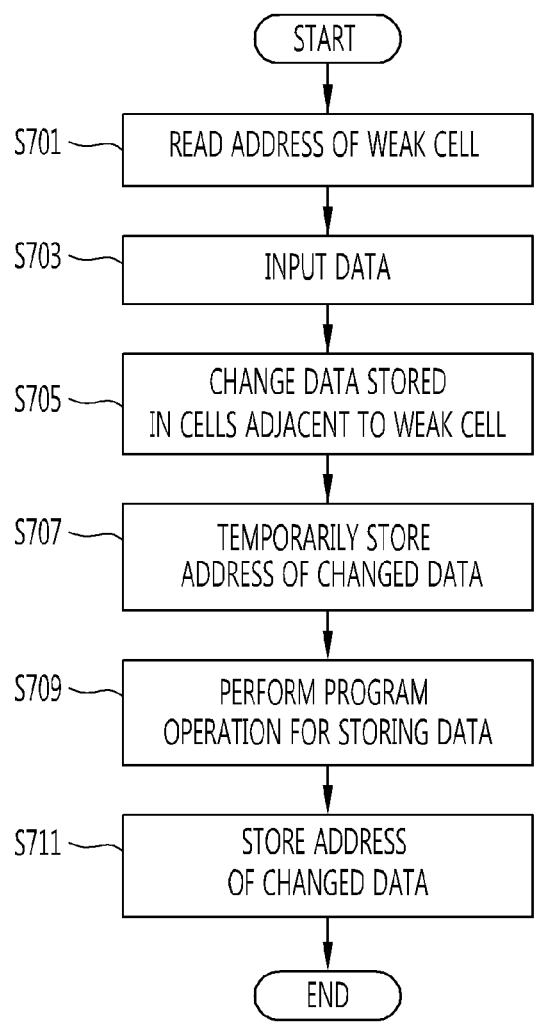

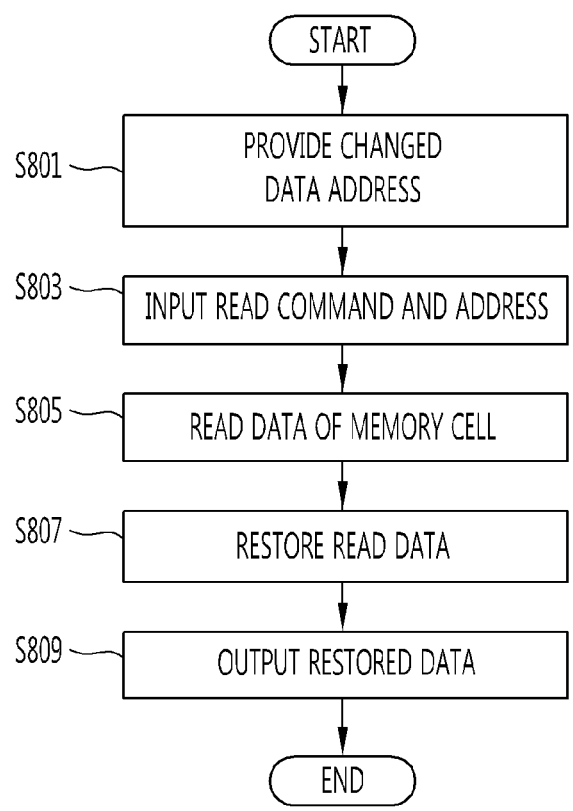

MEMORY SYSTEM

CROSS-REFERENCE TO RELATED APPLICATION

The present application claims priority to Korean patent application number 10-2013-0095014 filed on Aug. 9, 2013, in the Korean Intellectual Property Office, the entire disclosure of which is incorporated by reference herein.

BACKGROUND

1. Technical Field

The present invention generally relates to a memory system, and more particularly, to a memory system storing data.

2. Related Art

In order to store the large amount of data in a predetermined area, a method of increasing an integration degree or increasing the number of bits of data stored in each unit cell has been applied. However, as the number of times of program/erase is increased together with an increase in an integration degree, an electrical characteristic of a memory cell deteriorates. Accordingly, a circuit or an operating method capable of supplementing the deterioration of the electric characteristic has been demanded.

SUMMARY

The present invention has been made in an effort to provide a semiconductor memory device capable of improving an input/output characteristic of data.

An embodiment of the present invention provides a memory system, including: a memory controller configured to change data to be stored in memory cells according to an address of a weak cell in order to store changed data having a lower program level than a highest program level among a plurality of program levels in peripheral cells adjacent to the weak cell; and a memory device configured to execute a program loop in order to store the changed data in a selected page.

An embodiment of the present invention provides a memory system, including: a memory system, comprising: a memory device configured to store an address of changed data, and perform read operations for outputting the address of the changed data and data stored in memory cells; and a memory controller configured to change data having a lowest program level read from a peripheral cell adjacent to a weak cell among the memory cells to data having a higher program level than the lowest program level according to the address of the changed data.

An embodiment of the present invention provides a memory system, including: a memory controller configured to change input data of memory cells according to an address of a weak cell in order to store data having a lower program level than a highest program level among a plurality of program levels in peripheral cells adjacent to the weak cell; and a memory device configured to execute a program loop in order to store the data changed according to the address of the weak cell.

According to the embodiments of the present invention, it may be possible to improve an input/output characteristic of data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIGS. 6 to 8 are flowcharts for describing an operation of the memory system according to the embodiments of the present invention.

DETAILED DESCRIPTION

Hereinafter, an embodiment of the present invention will be described with reference to the accompanying drawings in detail. However, the present invention is not limited to the embodiments disclosed below and may be implemented in various forms and the scope of the present invention is not limited to the following embodiments. Rather, the embodiments are provided to more sincerely and fully disclose the present invention and to completely transfer the spirit of the present invention to those skilled in the art to which the present invention pertains, and the scope of the present invention should be understood by the claims of the present invention.

Figure 1:
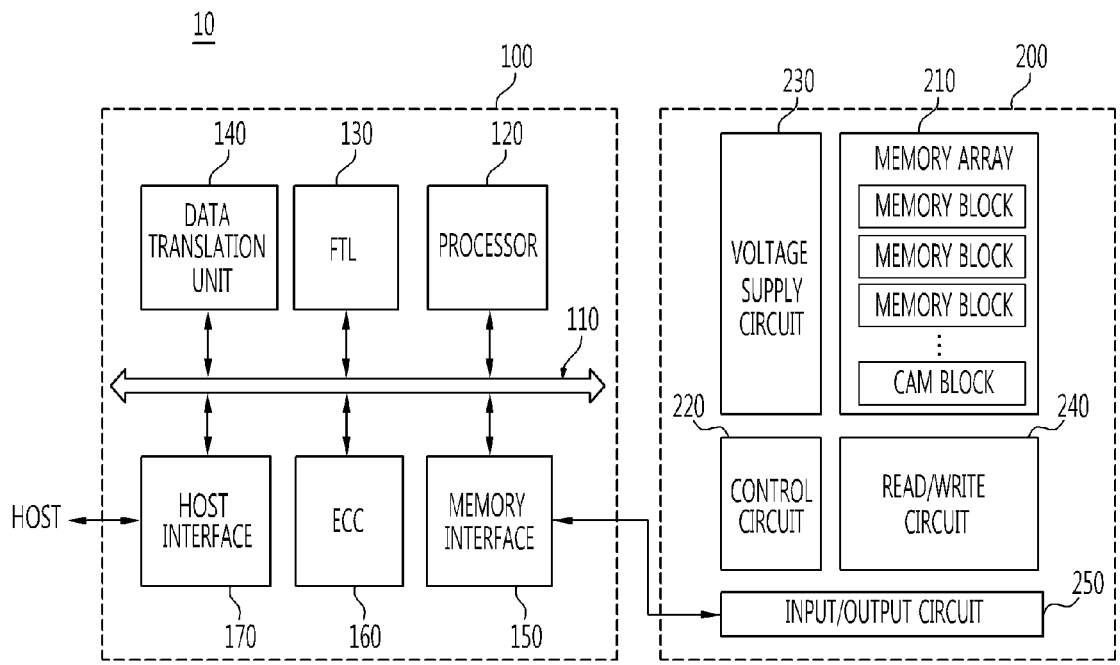
FIG. 1 is a block diagram illustrating a memory system according to an embodiment of the present invention.

FIG. 1 is a block diagram illustrating a memory system according to an embodiment of the present invention.

Referring to FIG. 1, the memory system 10 includes a memory controller 100 and a memory device 200. The memory controller 100 is connected to a host and the memory device 200. The memory controller 100 is configured to access the memory device 200 in response to a request from the host. For example, the memory controller 100 is configured to control a read operation, a program loop, and an erase loop of the memory device 200. The memory controller 100 is configured to provide an interface between the memory device 200 and the host. The memory controller 100 is configured to drive a firmware for controlling the memory device 200. The memory device 200 includes a flash memory device.

The memory controller 100 includes an internal bus 110, a processor 120, a Flash Translation Layer (FTL) 130, a data translation unit 140, a memory interface 150, an Error Correction Block (ECC) 160, and a host interface 170. The internal bus 110 is configured to provide a channel between the constituent elements of the memory controller 100. For example, the internal bus 110 may be a common channel for transmitting a command and data. In other examples, the internal bus 110 may include a command channel and a data channel for transmitting each of the command and the data.

The processor 120 is configured to control a general operation of the memory controller 100. The processor 120 may be configured to execute software and firmware driven in the memory controller 100.

The flash translation layer 130 provides various means for controlling the memory device 200. In a case where the memory device 200 is a flash memory device, the flash memory device 200 has different characteristics from those of a typical memory. First, the flash memory device 200 has an erase before write characteristic. Further, a unit of the read operation and the program look of the flash memory device 200 is different from a unit of an erase loop thereof. The read operation and the program loop of the flash memory device 200 is performed in the unit of a page, and the erase loop is performed in the unit of a memory block. The memory block includes a plurality of pages. Further, the number of times of program and erase of the flash memory device 200 is limited. Further, an erase time, a program time, and a read time of the flash memory device 200 are different from each other.

When the host accesses the flash memory device 200, the flash translation layer 130 provides various control means based on the aforementioned characteristic of the flash memory device 200. For example, the flash translation layer 130 provides a means for translating a logic address received from the host to a physical address of the flash memory device 200. The flash translation layer 130 makes information about a mapping relationship between the logic address and the physical address in a form of a table to maintain the information. The flash translation layer 130 provides a means for making a control so that the number of times of program and erase of the memory blocks of the flash memory device 200 becomes uniform. For example, the flash translation layer 130 provides a wear leveling means. The flash translation layer 130 provides various means for minimizing the number of times of erase of the flash memory device 200. For example, the flash memory device 200 provides a control means, such as a merge and a garbage collection.

In order to minimize a generation of a program interference phenomenon in a weak cell considering a poor electric characteristic of the weak cell when storing data in the memory device, the data translation unit 140 performs a function of changing data so that data of a low program level is stored in a peripheral cell adjacent to the weak cell. To this end, the data translation unit 140 may change data according to an address of the weak cell. The address of the weak cell address is provided from the memory device, and the memory device generates the address of the weak cell through the erase loop. When the data is changed by the data translation unit 140, the flash translation layer 130 generates an address of the changed data for identifying peripheral cells in which the changed data is stored.

Additionally, when the data read from the memory device is input, the data translation unit 130 restores the data of the low program level stored in the peripheral cell to data of a high program level in an original state according to the address of the changed data.

The aforementioned operation of changing the data will be described in detail with reference to FIGS. 6 to 8.

Figure 2:
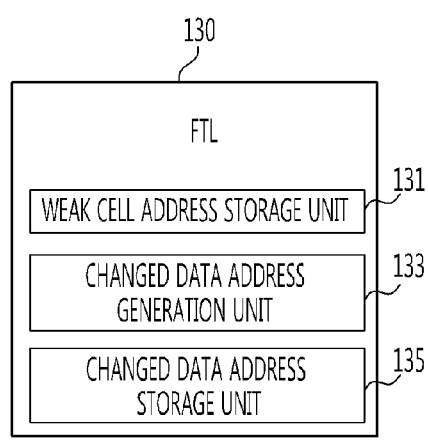
FIG. 2 is a block diagram for describing an FTL of a memory controller illustrated in FIG. 1.

Additionally, for the aforementioned operation, the flash translation layer 130 may include a weak cell address storage unit 131, a changed data address generator or changed data address generation unit 133, and a changed data address storage unit 135 (see FIG. 2). The weak cell address storage unit 131 temporarily stores the address of the weak cell provided by the memory device. When data stored in a peripheral cell adjacent to the weak cell is changed, the changed data address generator 133 performs a function of generating an address of the changed data for identifying the peripheral cell in which the changed data is stored. The changed address storage unit 135 performs a function of temporarily storing an address of the changed data for reference when the changed data is restored during the read operation.

The memory interface 150 includes a protocol for a communication with the flash memory device 200. For example, the memory interface 150 may include at least one of the flash interfaces, such as a NAND interface and a NOR interface.

The error correction block 160 may be configured to detect and correct an error of data read from the memory device 200.

The host interface 170 includes a protocol for performing a data exchange between the host and the memory controller 100. For example, the memory controller 100 is configured to communicate with an external device (the host) through at least one of various interface protocols, such as a Universal Serial Bus (USB) protocol, a Multimedia Card (MMC) protocol, a Peripheral Component Interconnection (PCI) protocol, a PCI-Express (PCI-E) protocol, an Advanced Technology Attachment (ATA) protocol, a serial-ATA protocol, a parallel-ATA protocol, a Small Computer Small Interface (SCSI) protocol, an Enhanced Small Disk Interface (ESDI) protocol, and an Integrated Drive Electronics (IDE) protocol, and a private protocol.

The memory controller 100 and the memory device 200 may be integrated as one semiconductor device. For example, the controller 100 and the memory device 200 may be integrated as one semiconductor device to configure a memory card. For example, the memory controller 100 and the memory device 200 may be integrated as one semiconductor device to form a PC card (Personal Computer Memory Card International Association (PCMCIA)), a Compact Flash (CF) card, Smart Media Cards (SM, SMC), a memory stick, Multimedia Cards (MMC, RS-MMC, and MMCmicro), SD cards (SD, miniSD, microSD, and SDHC), and a Universal Flash Storage (UFS). The memory controller 100 and the memory device 200 may be integrated as one semiconductor device to configure a semiconductor drive (solid state drive (SSD)).

Although it is not illustrated, the memory controller may further include a separate storage unit, in addition to the storage unit included in each constituent element. The storage unit may be used as a working memory of the processor 120, may be used as a buffer memory between the memory device 200 and the host, and may be used as a cache memory between the memory device 200 and the host. For example, the storage unit may include at least one of various memories allowing a random access, such as a Static RAM (SRAM), a Dynamic RAM (DRAM), a Synchronous DRAM (SDRAM), a Phase-change RAM (PRAM), a Magnetic RAM (MRAM), a Resistive RAM (RRAM), a Ferroelectric RAM (FRAM), and a NOR flash memory.

The memory device 200 includes a memory array 210 and peripheral circuits 220 to 250. Hereinafter, a case in which the memory device 200 is the flash memory device will be described as an example.

The memory array 210 includes a memory block and a CAM block. In a case of the NAND flash memory device, each memory block includes a plurality of memory strings connected between the bit lines and a common source line. Each memory string includes a drain selection transistor connected with a bit line, a source selection transistor connected with the common source line, a plurality of memory cells serially connected between the drain selection transistor and the source selection transistor. The memory cells of the memory strings are connected with the word lines. The memory cells connected to the word line configure one physical page. This will be described in more detail below.

Figure 3A:
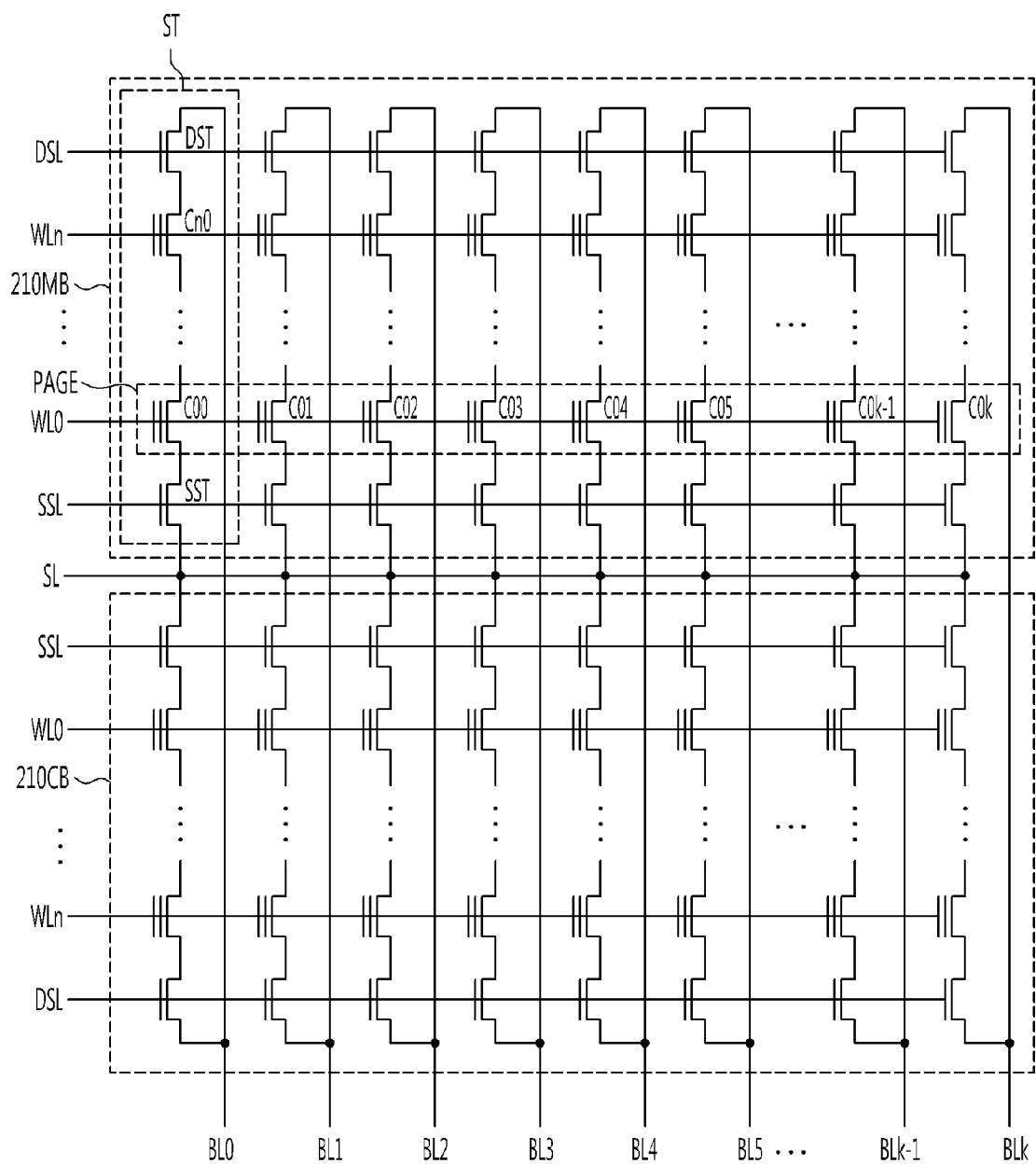
FIGS. 3A and 3B are circuit diagrams for describing a memory block and a CAM block of a memory device illustrated in FIG. 1.
Figure 3B:
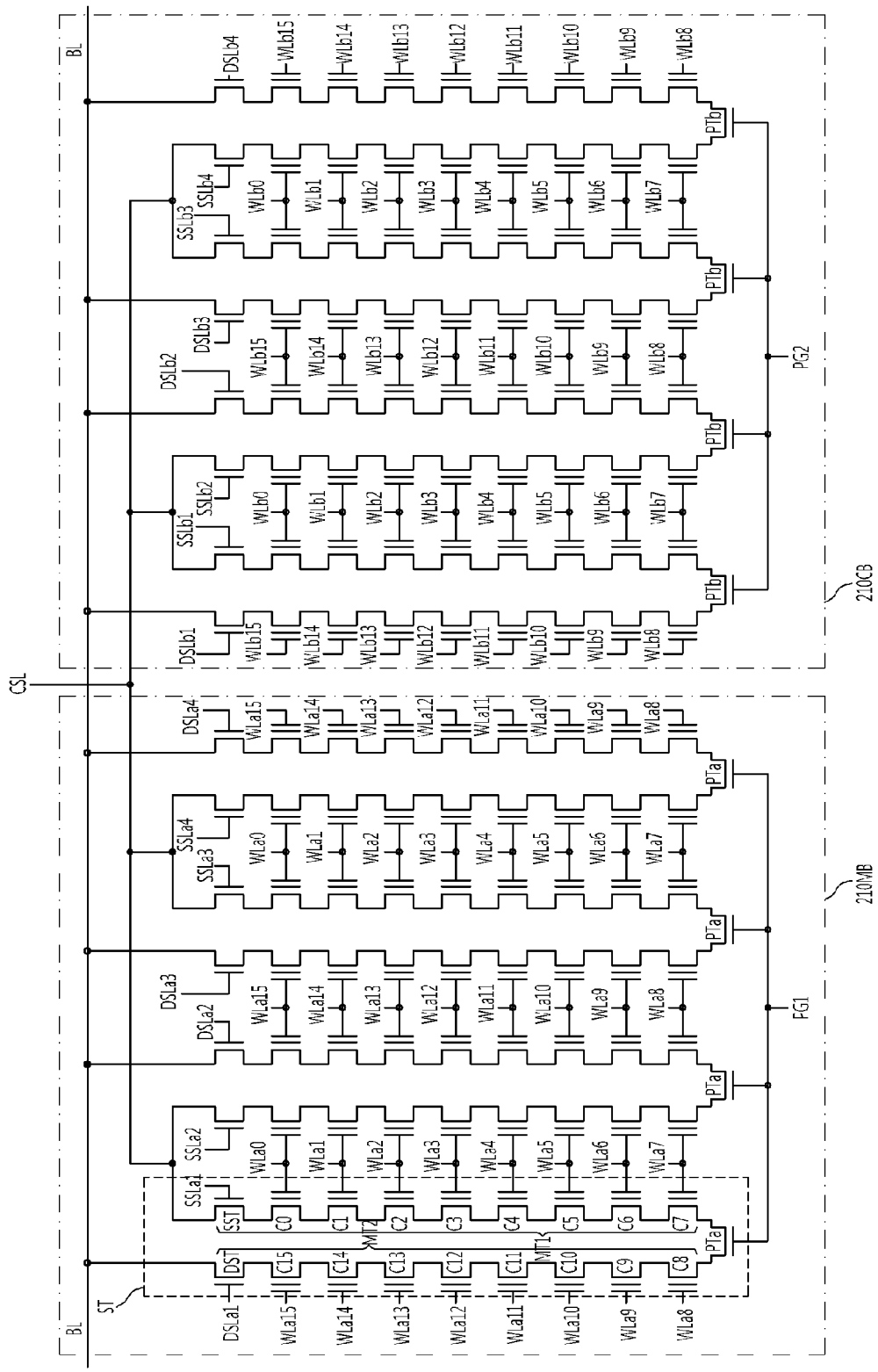

FIGS. 3A and 3B are circuit diagrams for describing the memory block and the CAM block of the memory device illustrated in FIG. 1.

Referring to FIG. 3A, each memory block 210MB includes a plurality of memory strings ST connected between bit lines BL0 to BLk and a common source line SL. That is, the memory strings ST are connected to the corresponding bit lines BL1 to BLk, respectively, and are commonly connected to the common source line SL. Each memory string ST1 includes a source select transistor SST in which a source is connected to the common source line SL, a plurality of cell strings serially connected with a plurality of memory cells C00 to Cn0, and a drain select transistor DST in which a drain is connected to the bit line BL0. The memory cells C00 to Cn0 included in the cell string are serially connected between the select transistors SST and DST. A gate of the source select transistor SST is connected to the source select line SSL, and gates of the memory cells C00 to Cn0 are connected to word lines WL0 to WLn, respectively, and a gate of the drain select transistor DST is connected to a drain select line DSL.

Here, the drain select transistor DST controls a connection or a block between the cell strings C00 to Cn0 and the bit line, and the source select transistor SST controls a connection or a block between the cell strings C00 to Cn0 and the common source line SL.

The memory cells included in the memory cell block in a NAND flash memory device may be divided in the unit of a physical page or the unit of a logical page. For example, the memory cells C00 to C0k connected to one word lines (for example, WL0) configure one physical page PAGE. Further, even numbered memory cells C00, C01, C03, C05, and C0k connected to one word line (for example, the word line WL0) configure one even physical page, and odd numbered memory cells C00, C02, C04, and C0k−1 configure one odd physical page. The page (or the even page and the odd page) serves as a basic unit of the program operation or the read operation.

A CAM block 210CB may be formed in the same structure as that of the memory block 210MB.

Referring to FIG. 3B, in a case of a 3D memory block, each memory block 210MB includes a plurality of memory strings ST. Each memory string ST in a P-BiCS structure includes a first memory string MT1 vertically connected between the common source line CSL and a pipe transistor PTa of a substrate, and a second memory string MT2 vertically connected between the bit line BL and the pipe transistor of the substrate. The first memory string MT1 includes the source select transistor SST and the memory cells C0 to C7. The source select transistor SST is controlled by a voltage applied to a source select line SSLa1, and the memory cells C0 to C7 are controlled by a voltage applied to the stacked word lines WLa0 to WLa7. The second memory string MT2 includes the drain select transistor DST and the memory cells C8 to C15. The drain select transistor SST is controlled by a voltage applied to a drain select line DSLa1, and the memory cells C8 to C15 are controlled by a voltage applied to the stacked word lines WLa8 to WLa15.

When the memory block 210MB is selected, the pipe transistor PTa connected between the pair of memory cells C7 and C8 positioned at a center in the memory string having the P-BiCS structure performs an operation of electrically connecting channel layers of the first memory string MT1 and channel layers of the second memory string MT2 included in the selected memory block 210MB.

Additionally, in a memory block having a 2D structure, one memory string is connected to each bit line, and the drain select transistors of the memory block are simultaneously controlled by one drain select line, but in the memory block 210MB having the 3D structure, the plurality of memory strings ST is commonly connected to each bit line BL. In the same memory block 210MB, the number of memory strings ST commonly connected to one bit line BL and controlled by the same word lines may be changed according to a design.

The plurality of memory strings is connected to one bit line BL in parallel, so that in order to selectively connect one bit line BL and the memory strings ST, the drain select transistors DST are independently controlled by the select voltages applied to the drain select lines DSLa1 to DSLa4.

The memory cells C0 to C7 of the first memory string MT1 and the memory cells C8 to C15 of the second memory string MT2 vertically connected in the memory block 210MB are controlled by operating voltages applied to the stacked word lines WLa0 to WLa7 and the stacked word lines WLA8 to WLa15, respectively. The word lines WLa0 to WLa15 are divided by the unit of the memory block.

A CAM block 210CB may be formed in the same structure as that of the memory block 210MB. The memory cells of the memory block 210MB are operated by the voltages applied to the word lines WLa0 to WLa15, and the memory cells of the CAM block 210CB are operated by voltages applied to word lines WLb0 to WLb15. That is, when the memory block 210MB is selected, the operating voltages are applied to the word lines WLa0 to WLa15 so that the memory cells of the memory block 210MB are operated, and when the CAM block 210CB is selected, the operating voltages are applied to the word lines WLb0 to WLb15 so that the memory cells of the memory block 210CB are operated.

FIG. 3B also illustrates source select lines SSLb1 to SSLb4, and drain select lines DSLb1 to DSLb4 of the CAM block 210CB.

Referring to FIG. 1 again, the peripheral circuits 220 to 250 are configured to perform the erase loop (the erase operation and the erase verification operation), the program loop (the program operation and the program verification operation), and the read operation of the memory block. The peripheral circuit includes a control circuit 220, a voltage supply circuit 230, a read/write circuit 240, and an input/output circuit 250.

The control circuit 220 controls the voltage supply circuit, the read/write circuit 240, and the input/output circuit 250 during the erase loop, the program loop, and the read operation of the memory cells.

The voltage supply circuit 230 outputs the operating voltages necessary for the erase loop, the program loop, and the read operation to the memory block or the CAM block.

The read/write circuit 240 senses and latches data stored in the memory cells through the bit lines during the read operation or the verification operation, or selectively applies a program prohibition voltage and a program allowance voltage to the bit lines according to the data stored in the memory cells during the program operation. The read/write circuit 240 may be implemented in a page buffer.

The input/output circuit 250 is configured to transmit data input from the memory controller 100 to the read/write circuit 240, or output the data read from the memory cells to the memory controller 100.

Figure 4:
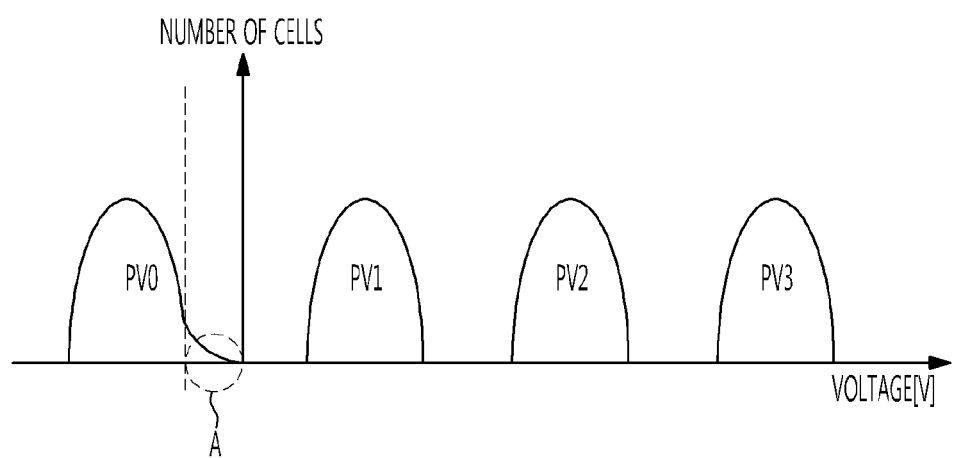
FIG. 4 is a distribution diagram for describing an operation of the memory system according to the embodiments of the present invention.
Figure 5:
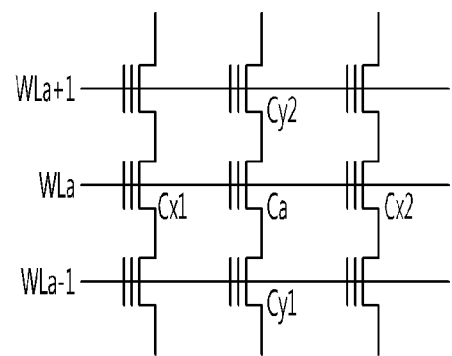
FIG. 5 is a circuit diagram for describing an operation of the memory system according to the embodiments of the present invention.

FIG. 4 is a distribution diagram for describing the operation of the memory system according to the embodiments of the present invention. In FIG. 4 the x-axis illustrates the voltage of the cells and the y-axis illustrates the number of cells. FIG. 5 is a circuit diagram for describing the operation of the memory system according to the embodiments of the present invention.

Referring to FIGS. 4 and 5, when the erase loop of the memory cells included in the memory block is completed, threshold voltages of the memory cells are distributed at an erase level PV0. There are memory cells having a threshold voltage A higher than a reference voltage Vref among the erased memory cells, and those cells are defined as weak cells (for example, Ca). The threshold voltage A of the weak cell Ca is not decreased by the erase loop, and may be easily increased by a disturb phenomenon or an interference phenomenon during the program operation of the peripheral cell (for example, Cx1 and Cx2).

That is, in a case where data having a higher program level PV2 or PV3 than the lowest program level PV1 is stored in the peripheral cell Cx1 for Cx2, the threshold voltage A of the weak cell Ca is increased, so that the data of the erase level PV0 stored in the weak cell Ca may be recognized as the data of the first program level PV1.

Accordingly, in a case where data of a higher program level (for example, PV3) than the lowest program level PV1 is applied to the peripheral cell Cx1 and Cx2 adjacent to the weak cell Ca in which the data of the erase level is stored, the data stored in the peripheral cell Cx1 is changed to the data of the lowest program level PV1 and then the changed data is stored in the memory cells. Then, when the data is read from the memory cells, the data of the peripheral cells Cx1 and Cx2 adjacent to the weak cell Ca is changed to the data of the higher program level PV3 than the lowest program level PV1.

Additionally, the peripheral cells Cx1 and Cx2 adjacent to the weak cell Ca may be connected to the same word line WLa as that of the weak cell Ca, and other peripheral cells Cy1 and Cy2 may also be connected to other word lines WLa−1 and WLa+1 different form that of the weak cell Ca.

Hereinafter, the aforementioned method of inputting/outputting data will be described in more detail.

FIGS. 6 to 8 are flowcharts for describing the operation of the memory system according to the embodiments of the present invention.

Referring to FIGS. 4 to 6, in order to change data stored in the peripheral cells Cx1 and Cx2 adjacent to the weak cell Ca, the memory device needs to identify a memory cell which is a weak cell. First, in steps S601, S603, and S605, the memory device performs an erase loop of a selected memory block. In step S601, the memory device performs an erase operation of the selected memory block. In step S603, the memory device identifies whether all of the memory cells are erased by performing an erase verification operation. For example, the memory device may identify whether the memory cells are erased by comparing threshold voltages of the memory cells and an erase verification voltage. In this case, the erase verification operation may be performed in the unit of the memory block. That is, the voltage supply circuit applies the erase verification voltage to all of the word lines of the selected memory block, and the read/write circuit identifies whether a current flows from the bit line to the common source line to perform the erase verification operation. When the erase is not passed in step S603, the erase voltage is increased in step S605, and then the memory device re-performs the erase operation in step S601.

When it is identified that the erase is passed in step S603, threshold voltages of the memory cells are distributed at an erase level PV0. Next, an operation for detecting a weak cell is performed.

In step S607, after the erase loop is completed, the memory device performs a verification operation for comparing the threshold voltages of the erased memory cells and the reference voltage Vref. In this case, the verification operation may be performed in the unit of the page or in the unit of the word line. That is, the verification operation may be sequentially performed from the first page (or the first word line) to the last page (or the last word line). The memory device defines the memory cell having the threshold voltage A higher than the reference voltage among the erased memory cells as the weak cell (for example, Ca), and defines an address of the detected weak cell Ca as an address of the weak cell. A result of the comparison between the threshold voltage and the reference voltage is stored in the read/write circuit, and the control circuit generates the address of the weak cell according to the result of the comparison stored in the read/write circuit.

In step S609, the memory device stores the address of the weak cell in the CAM block.

Hereinafter, an operation of changing data by using the address of the weak cell and storing the changed data in the memory cells will be described.

Referring to FIGS. 4, 5, and 7, in step S701, the memory device provides the address of the weak cell to the memory controller. The memory device may provide the address of the weak cell to the memory controller before performing the program operation. For example, when power is supplied in a power-off state, the memory device may read the address of the weak cell from the CAM block, and provide the read address of the weak cell to the memory controller.

In step S703, data for storing in the memory cells is input.

In step S705, the memory controller changes a program level of the data stored in the peripheral cells Cx1 and Cx2 adjacent to the weak cell Ca. When the data having the high program level is stored in the peripheral cells Cx1 and Cx2, the threshold voltage of the weak cell Ca is increased by a program disturb phenomenon or an interference phenomenon. The threshold voltage of the weak cell Ca is distributed at the erase level PV0, but is distributed at the highest level A in the erase levels. Accordingly, when the threshold voltage is increased by the disturb phenomenon or the interference phenomenon, the data stored in the weak cell Ca may be changed. Accordingly, in order to minimize the generation of the program disturb phenomenon or the interference phenomenon in the weak cell Ca, the memory controller changes the data so that the data having a low program data is stored in the peripheral cells Cx1 and Cx2.

For example, when the data of the erase level PV0 is stored in the weak cell Ca, and the data having the higher program level PV2 or PV3 (preferably, the highest program level PV3) than the lowest program level PV1 is stored in the peripheral cells Cx1 and Cx2, the memory controller may change the data according to the address of the weak cell so that the data having the lower program level PV1 or PV2 (preferably, the lowest program level PV1) than the highest program level PV3 in the peripheral cells Cx1 and Cx2. Preferably, when the data having the erase level PV0 is stored in the weak cell Ca, and the data of the highest program level PV3 is stored in the peripheral cells Cx1 and Cx2, the memory controller may change the data according to the address of the weak cell so that the data having the lowest program level PV1 is stored in the peripheral cells Cx1 and Cx2.

Here, the peripheral cells Cx1 and Cx2 may be connected to the same word line WLa as that of the weak cell Ca. Further, the peripheral cells Cy1 and Cy2 may also be connected to the word lines WLA−1 and WLa+1 different from that of the weak cell Ca, respectively. In the latter case, since the program level of the data stored in the peripheral cell Cy1 does not exert an influence on the interference phenomenon or the disturb phenomenon of the weak cell Ca, the memory controller may also change only the program level of the data stored in the peripheral cell Cy2 among the peripheral cells Cy1 and Cy2.

In step S707, the memory controller generates an address of the changed data. That is, an address of the peripheral cell in which the changed data is to be stored is generated as the address of the changed data. The generated address of the changed data is temporarily stored in the changed data address storage unit.

In step S709, the memory device stores the data in the memory cells through the program loop. To this end, the memory controller may provide a program command signal, the address, and the data to the memory device. Here, the address is not the address of the changed data, but an address for selecting the memory cells in which the data is to be stored. Then, the data includes the changed data.

In step S711, the memory device stores the address of the changed data. The address of the changed data may be stored in the CAM block of the memory device. The memory device may store the address of the changed data in the CAM block at a standby mode, such as an idle time, after the program loop is completed.

Hereinafter, an operation of restoring the data read from the memory cells by using the address of the changed data, and outputting the restored data will be described.

Referring to FIGS. 4, 5, and 8, in step S801, the memory device provides the address of the changed data to the memory controller. The memory device may provide the address of the changed data to the memory controller before performing the read operation. For example, when power is supplied in a power-off state, the memory device may read the address of the changed data from the CAM block, and provide the read address of the changed data to the memory controller.

In step S803, the memory controller inputs a read command and the address to the memory controller according to a request of the host. Here, the address is not the address of the changed data, but an address for selecting the memory cells in which the data for reading is stored.

In step S805, the memory device reads the data from the selected memory cells by performing the read operation according to the read command and the address. The read data includes the data changed in aforementioned step S705. The memory device provides the read data to the memory controller.

In step S807, the memory controller (especially, the data translation unit) restores the data read from the peripheral cells Cx1 and Cx2 adjacent to the weak cell Ca according to the address of the changed data. For example, the memory controller (especially, the data translation unit) changes the data having the lowest program level PVP1 read from the peripheral cells Cx1 and Cx2 adjacent to the weak cell Ca to the data of the higher program level (for example, the highest program level PV3) than the lowest program level PV1 according to the address of the changed data. More particularly, when the data having the erase level PV1 is read from the weak cell Ca, and the data having the lowest program level PV1 is read from the peripheral cells Cx1 or Cx2, the memory controller may restore the data read from the peripheral cells Cx1 or Cx2 to the data of the highest program level PV3 according to the address of the changed data.

Here, the peripheral cells Cx1 and Cx2 may be connected to the same word line WLa as that of the weak cell Ca. Further, the peripheral cells Cy1 and Cy2 may also be connected to the word lines WLA−1 and WLa+1 different from that of the weak cell Ca, respectively. In the latter case, since the program level of the data stored in the peripheral cell Cy1 does not exert an influence on the interference phenomenon or the disturb phenomenon of the weak cell Ca, the memory controller may also change only the program level of the data stored in the peripheral cell Cy2 among the peripheral cells Cy1 and Cy2.

In step S809, the memory controller outputs the restored data to the host according to the address of the changed data.

As described above, the data having the low program level is stored in the peripheral cell adjacent to the weak cell, so that it is possible to improve a data input/output characteristic by minimizing a disturb phenomenon or an interference phenomenon of the weak cell. Accordingly, the data input/output characteristic of all of the electronic products including the aforementioned memory system may be improved.

As described above, the embodiments have been disclosed in the drawings and the specification. The specific terms used herein are for purposes of illustration, and do not limit the scope of the present invention defined in the claims. Accordingly, those skilled in the art will appreciate that various modifications and other equivalent examples may be made without departing from the scope and spirit of the present disclosure. Therefore, the sole technical protection scope of the present invention will be defined by the technical spirit of the accompanying claims.

What is claimed is:

1. A memory system, comprising:
a memory controller configured to change data to be stored in memory cells according to an address of a weak cell in order to store changed data having a lower program level than a highest program level among a plurality of program levels in peripheral cells adjacent to the weak cell; and
a memory device configured to execute a program loop in order to store the changed data in a selected page,
wherein the memory controller generates an address of the changed data for identifying peripheral cells in which the changed data is stored,
wherein the memory device stores the address of the changed data in a Content Address Memory block in a standby mode.

2. The memory system of claim 1, wherein the memory device provides the address of the weak cell to the memory controller.

3. The memory system of claim 2, wherein when power is supplied in a power-off state, the memory device provides the address of the weak cell to the memory controller.

4. The memory system of claim 2, wherein the memory device sets addresses of the weak cells having higher threshold voltages than a reference voltage among the memory cells of a memory block erased by an erase loop as addresses of the weak cells.

5. The memory system of claim 4, wherein the memory device stores the address of the weak cell in the Content Address Memory block after the erase loop is completed.

6. The memory system of claim 4, wherein the memory device performs a first verification operation of comparing the threshold voltage and a verification voltage in the unit of a memory block after an erase operation is performed, and performs a second verification operation of comparing the threshold voltage and the reference voltage in order to detect the weak cell is performed in the unit of a page after the erase operation is completed.

7. The memory system of claim 1, wherein the memory controller includes a flash translation layer for generating the address of the changed data, and a data translation unit for changing the data according to the address of the weak cell.

8. The memory system of claim 1, wherein the memory controller outputs the address of the changed data to the memory device when the program loop is completed.

9. The memory system of claim 8, wherein the memory device stores the address of the changed data in the Content Address Memory block.

10. The memory system of claim 1, wherein the weak cell and the peripheral cell are connected to different word lines.

11. The memory system of claim 1, wherein the weak cell and the peripheral cell are connected to the same word line.

12. The memory system of claim 1, wherein the memory controller changes the data according to the address of the weak cell so that data having a lowest program level is stored in the peripheral cell when data having an erase level is stored in the weak cell and data having the highest program level is stored in the peripheral cell.

13. A memory system, comprising:
a memory device configured to store an address of changed data, and perform read operations for outputting the address of the changed data and data stored in memory cells; and
a memory controller configured to change data having a lowest program level read from a peripheral cell adjacent to a weak cell among the memory cells to data having a higher program level than the lowest program level according to the address of the changed data,
wherein the memory device stores the address of the changed data in a Content Address Memory block in a standby mode.

14. The memory system of claim 13, wherein when power is supplied in a power-off state, the memory device provides the address of the weak cell to the memory controller.

15. The memory system of claim 13, wherein the memory device stores the data in a memory block, and stores the address of the changed data in the Content Address Memory.

16. The memory system of claim 13, wherein when the data having an erase level is read from the weak cell, and the data having the lowest program level is read from the peripheral cell, the memory controller restores the data read from the peripheral cell to data having a highest program level according to the address of the changed data.

17. The memory system of claim 13, wherein the memory controller includes a flash translation layer for identifying the data changed according to the address of the changed data, and a data translation unit for restoring the data according to a result of the identification of the flash translation layer.

18. The memory system of claim 13, wherein the weak cell and the peripheral cell are connected to different word lines.

* * * * *